(12) United States Patent
Osler et al.

(10) Patent No.: US 6,768,749 B1
(45) Date of Patent: Jul. 27, 2004

(54) DUAL-CHANNEL COMMUNICATIONS PROTOCOL PROVIDING ENHANCED CAPABILITIES FOR MODEMS

(75) Inventors: Bruce P. Osler, Hudson, NH (US); Kevin Riley, Tyngsboro, MA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/417,685

(22) Filed: Oct. 14, 1999

(51) Int. Cl.[7] .......................... H04J 3/12; H04M 3/42; H04L 5/16
(52) U.S. Cl. ...................... 370/524; 370/445; 375/222; 455/522
(58) Field of Search ................................. 370/264, 359, 370/437–439, 546, 524, 352, 445; 375/222; 380/266, 269, 33; 455/522; 709/227

(56) References Cited

U.S. PATENT DOCUMENTS

| | | | | |
|---|---|---|---|---|
| 4,405,829 A | | 9/1983 | Rivest et al. ............... 178/22.1 |
| 4,512,017 A | * | 4/1985 | Nici et al. ................... 370/524 |
| 4,707,832 A | * | 11/1987 | Glenn et al. ................. 370/489 |
| 5,210,794 A | * | 5/1993 | Brunsgard .................. 380/257 |
| 5,530,702 A | * | 6/1996 | Palmer et al. ............... 370/445 |
| 6,041,356 A | * | 3/2000 | Mohammed ................. 709/227 |
| 6,282,204 B1 | * | 8/2001 | Balatoni et al. ............. 370/421 |
| 6,359,909 B1 | * | 3/2002 | Ito et al. ..................... 370/522 |
| 6,473,423 B1 | * | 10/2002 | Tebeka et al. ............... 370/352 |

OTHER PUBLICATIONS

Heath, J., "LZH Data Compression," submitted to Telecommunications Industry Association (TIA) Technical Committee TR–30 Meetings, San Jose, California, Apr. 14, 1999.

* cited by examiner

*Primary Examiner*—Afsar Qureshi
(74) *Attorney, Agent, or Firm*—Hamilton, Brook, Smith & Reynolds, P.C.

(57) ABSTRACT

A system providing a framework for the negotiation of a dual-channel communication protocol between modems connected by a communications link. The dual-channel communications link includes a data channel used for sending and receiving data or code and a command channel for sending and receiving command and status information. Enhanced capabilities include providing that data on the data channel may be compressed using one of a plurality of compression algorithms, data may also be encrypted using one of a plurality of encryption algorithms. Additionally, LCP spoofing is provided as a way to reduce the time required to establish PPP links.

15 Claims, 6 Drawing Sheets

DUAL-CHANNEL COMMUNICATIONS PROTOCOL PROVIDING ENHANCED CAPABILITIES FOR MODEMS

BACKGROUND OF THE INVENTION

The present invention relates generally to computer data communications, and more particularly to communications protocols providing enhanced capabilities for modems.

Computers use various networking and data communications techniques to transmit information from one computer to another over a network. A typical network includes a series of interconnected data communications devices that can each exchange data from one device to another, enabling the exchange of information. In a typical computer networking application, source and destination computers are personal computers, workstations, servers, or the like, which each include a modem or other transmitter/receiver that is used to establish a connection to the network and transmit/receive information from computer to computer.

Modem connections typically are established using a Public Switched Telephone Network ("PSTN"). These connections are bandwidth limited and transmit times can become exceedingly long when large amounts of information are transmitted. Data compression techniques exist to reduce the amount of data transferred, many are based upon the Lempel-Ziv ("LZ") family of compression algorithms (e.g., V.42bis) or Huffman coding techniques (e.g., MNP5). Additionally, other enhanced capabilities for modems, such as encryption, are desirable. This is especially true as wireless/cellular modems are increasingly used for the transmission of confidential data. Other time sensitive operations (e.g., protocol negotiations) can be improved by modems with enhanced capabilities.

SUMMARY OF THE INVENTION

Existing modem compression protocols are usually designed to handle redundant (e.g., text strings) data and can fail (i.e., not reduce the amount of data transferred) when presented with non-redundant (e.g., .JPG or .MPF) data. A common example of this is MNP5 compression which will "compress" .ZIP files, resulting in a "compressed" file larger than the original. A framework for monitoring compression performance and switching compression algorithms to optimize throughput is desirable. The present invention provides a framework for the negotiation of a dual-channel communication protocol between modems connected by a communications link. The present invention, for example, allows for a more optimal compression algorithm to be employed on the communications link established between modems. The system disables existing compression protocols and detects conditions which allow for the negotiation of a dual-channel communication link. The dual-channel communications link includes a data channel used for sending and receiving data and a command channel for sending and receiving command and status information. Data on the data channel is compressed using one of a plurality of compression algorithms.

In one embodiment of the present invention a framework for the negotiation of a dual-channel communication protocol between modems connected by a communications link is provided for enabling data compression. An initializer disables an existing communications protocol and a detector determines conditions that allow for the negotiation of the dual-channel communication protocol. A channel builder for establishing the dual-channel communications protocol creates a first channel of the dual-channel communications protocol enabled for sending and receiving data and a second channel of the dual-channel communications protocol enabled for channel command and status information. A negotiator selects a compression algorithm for running on the first channel from a plurality of compression algorithms.

In another embodiment of the present invention a framework for the negotiation of a dual-channel communication protocol between modems connected by a communications link is provided to spoof the Link Control Protocol ("LCP") negotiation phase of Point-to-Point Protocol ("PPP") establishment. An initializer prepares the communications line for the establishment of the dual-channel. A channel builder transmits LCP parameter information and establishes the dual-channel communications protocol creating a first channel of the dual-channel communications protocol enabled for sending and receiving data and a second channel of the dual-channel communications protocol enabled for channel command and status information. A negotiator selects an algorithm for downloading over the first channel and running on the client to negotiate LCP negotiation from a plurality of algorithms stored on the server.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
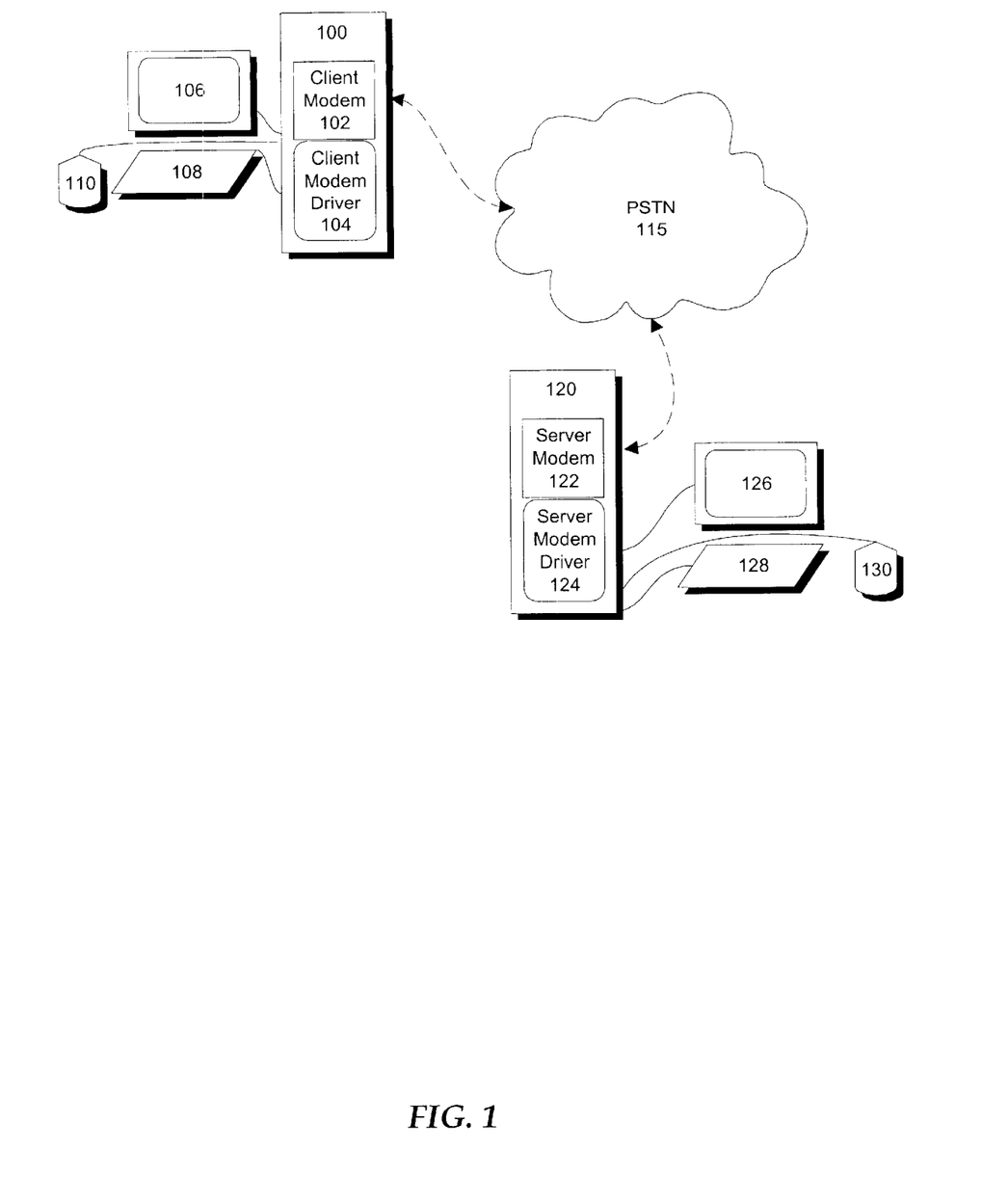
FIG. 1 is a block diagram of a system of computers configured according to an embodiment of the present invention.

FIG. 1 is a block diagram of a system of computers configured according to an embodiment of the present invention. A client computer 100 is connected to a monitor 106 for displaying and gathering information, a keyboard input device 108 and a pointing device 110 for selecting points on the monitor 106. The client computer 100 may be connected to a server computer 120 through a network, such as the PSTN 115. A server computer 120 is connected to a monitor 126 for displaying and gathering information, a keyboard input device 128 and a pointing device 130 for selecting points on the monitor 126.

Each computer (client computer 100 and server computer 120) has a modem (client modem 102 and server modem 122, respectfully) that enables transmission of information over a standard telephone line to other computers connected by the PSTN 115. Because a computer is digital (works with discrete electrical signals representing binary 1 and binary 0) and a telephone line is analog (carries a signal that can have any of a large number of variations), modems are needed to convert digital to analog and vice versa. When transmitting, modems impose (modulate) a computer's digital signals onto a continuous carrier frequency on the telephone line. When receiving, modems sift out (demodulate) the information from the carrier and transfer it in digital form to the computer. Sophisticated modems are also capable of such functions as digital error correction, limited data compression, automatic dialing, answering, and redialing in addition to transmitting and receiving. Without appropriate communications software, however, modems cannot perform any useful work.

Client modem 102 and server modem 122 are each controlled by communications software in the form of client modem driver 104 and server modem driver 124, respectfully. Client modem driver 104 and server modem driver 124 are capable of establishing a communications protocol for transferring data between applications running on client computer 100 and server computer 120.

Figure 2:
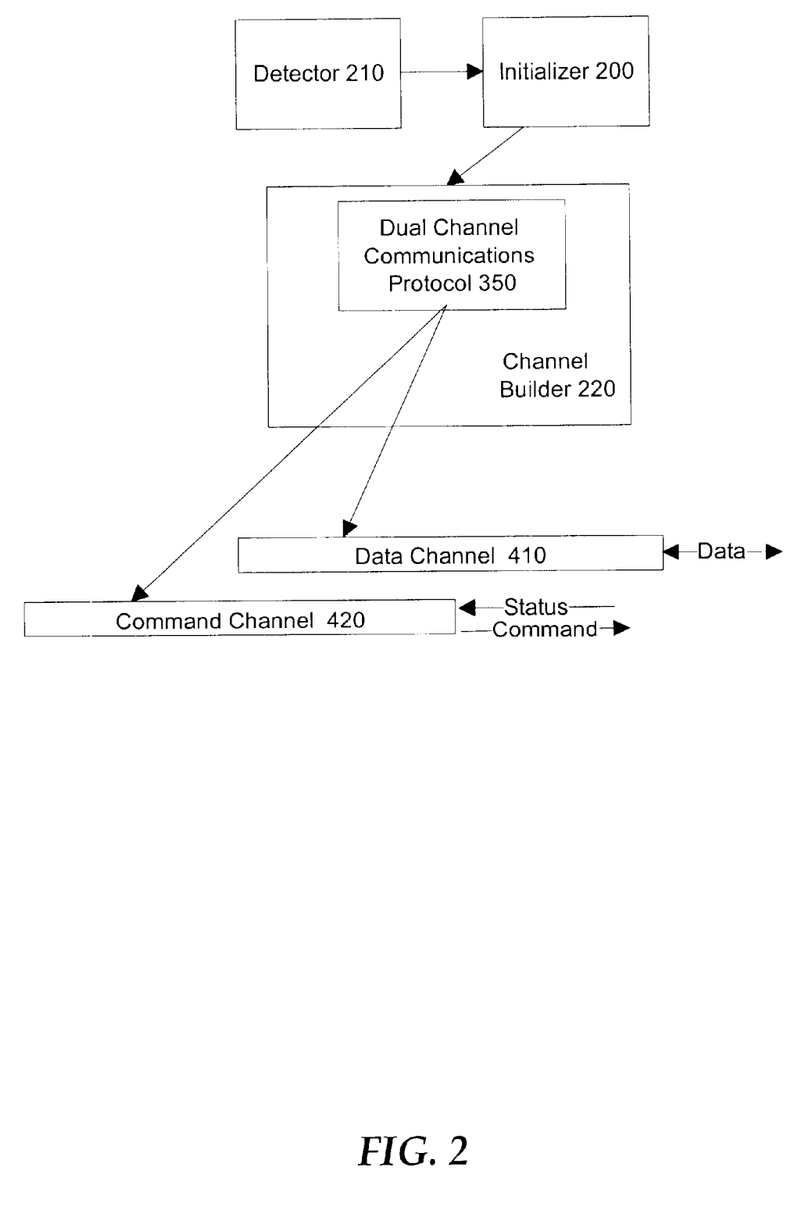
FIG. 2 is a block diagram of a system providing a framework for the negotiation of a dual-channel communications protocol configured according to an embodiment of the present invention.

FIG. 2 is a block diagram of a system providing a framework for the negotiation of a dual-channel communications protocol configured according to an embodiment of the present invention. The detector 210 will detect conditions where it is desirable to establish a data and command channel configured according to the present invention. The detector 210 will communicate that condition to initializer 200 which invokes the dual channel communications protocol 350 in the channel builder 220, triggering the data and command channel protocol 350 to create data channel 410 and command channel 420.

Figure 3:
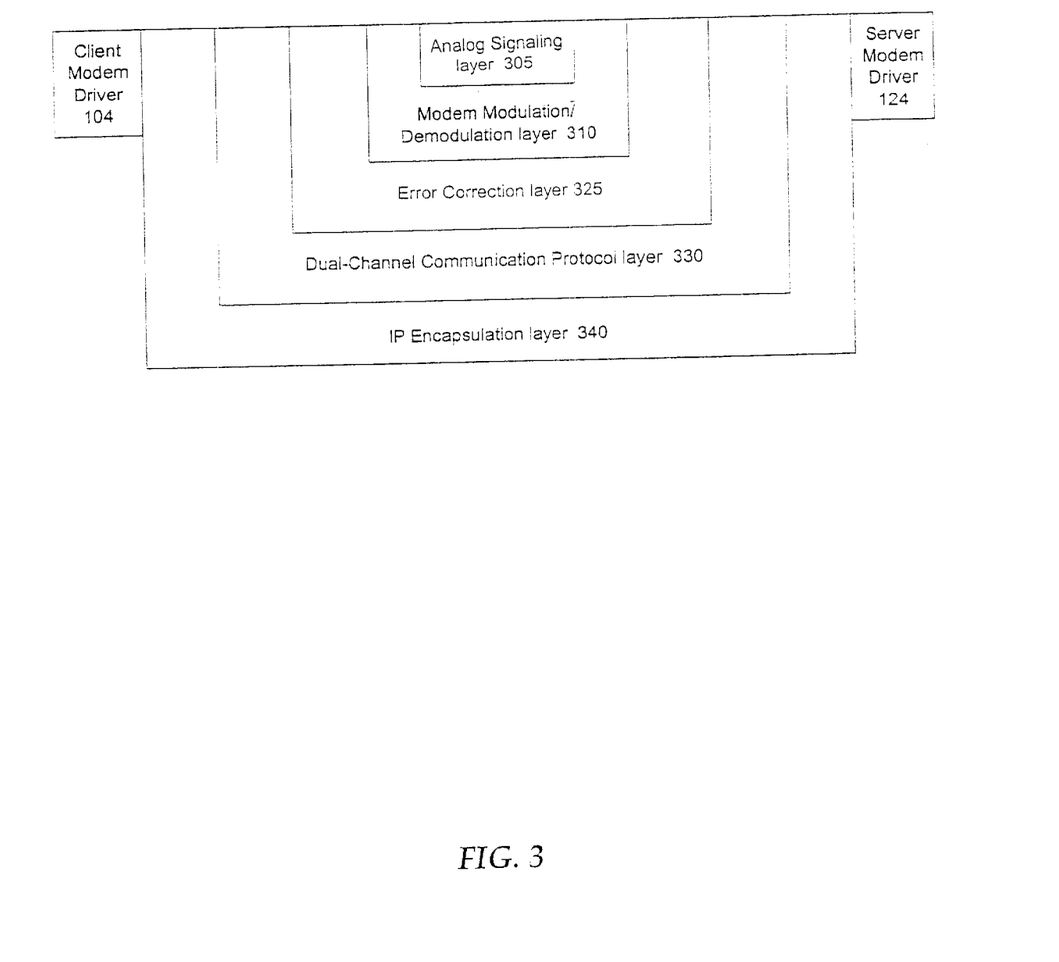
FIG. 3 is a schematic diagram showing various levels of protocols and negotiations involved in modem communications by an embodiment of the present invention.

FIG. 3 is a schematic diagram showing various levels of protocol layers involved in establishing a communications protocol for transferring data as configured according to an embodiment of the present invention. Because the communications protocol is being established over a telephone line that carries continuously varying analog signals, an analog signaling layer 325 is used by the client modem driver 104 and server modem driver 124 to establish a physical (analog) connection. Once analog signaling is established, analog data that is transferred is converted into digital form using modem the modulation/demodulation layer 310. All layers above the modem modulation/demodulation layer 310 (e.g., error correction layer 325, dual-channel communication protocol layer 330 and IP Encapsulation layer 340) communicate using a digital representation of data. Once digital transmission has been established a protocol is required to detect transmission errors and correct them to ensure the reliability of data transferred. Error correction protocol layer 325 detects and corrects transmission errors. The error correction protocol layer 325 can use a variety of techniques for detecting and correcting errors, including a checksum value. A checksum is a calculated value that is used to test data for the presence of errors that can occur when data is transmitted. The checksum is calculated for a given chunk of data by sequentially combining all the bytes of data with a series of arithmetic or logical operations, that checksum is transmitted with the data. When the data is received, a new checksum is calculated in the same way using the (possibly faulty) transmitted data. If the two checksums do not match, an error has occurred, and the data should be re-transmitted. Checksums cannot detect all errors, and they cannot be used to correct erroneous data. Multiple error correction protocol standards exist, The International Telecommunications Union ("ITU") has defined V.42 and a defacto industry standard exists in the Microcom Networking Protocol ("MNP"). The V.42 error correction protocol incorporates a correction procedure called Link Access Procedure for Modems ("LAPM"). In the event that the device negotiating error correction does not support V.42, the two modem drivers will try to negotiate the use of MNP error correction. The dual-channel communications protocol layer 330 is a mechanism for establishing a data channel and a command channel between a client modem driver 104 and a server modem driver 124. The dual-channel communications protocol layer 330 disables any existing compression protocol, detects conditions where establishing a dual-channel communications link is possible, establishes a dual-channel communications link and negotiates a compression algorithm over the data channel portion of the link. A dual-channel communications protocol 350 is implemented in the dual-channel communications protocol layer 330 and is described in more detail in the following discussion of FIG. 4. Once the dual-channel communications protocol 350 has established a data channel, Internet Protocol ("IP") packets can be transmitted reliably and efficiently between modems. IP is the protocol within TCP/IP that governs the breakup of data messages into packets, the routing of the packets from sender to destination, and the reassembly of the packets into the original data messages at the destination. IP corresponds to the network layer in the ISO/OSI model. IP packets can be transmitted by the Point-to-Point Protocol ("PPP"), a data link protocol developed by the Internet Engineering Task Force in 1991 for dial-up telephone connections, such as between a computer and the Internet. An alternative to PPP is the Serial Line Internet Protocol ("SLIP"), a data link protocol that allows transmission of IP data packets over dial-up telephone connections. PPP provides greater protection for data integrity and security than does SLIP, at a cost of greater overhead. The IP Encapsulation 340 provides the support to transmit IP packets over PPP or SLIP.

Figure 4:
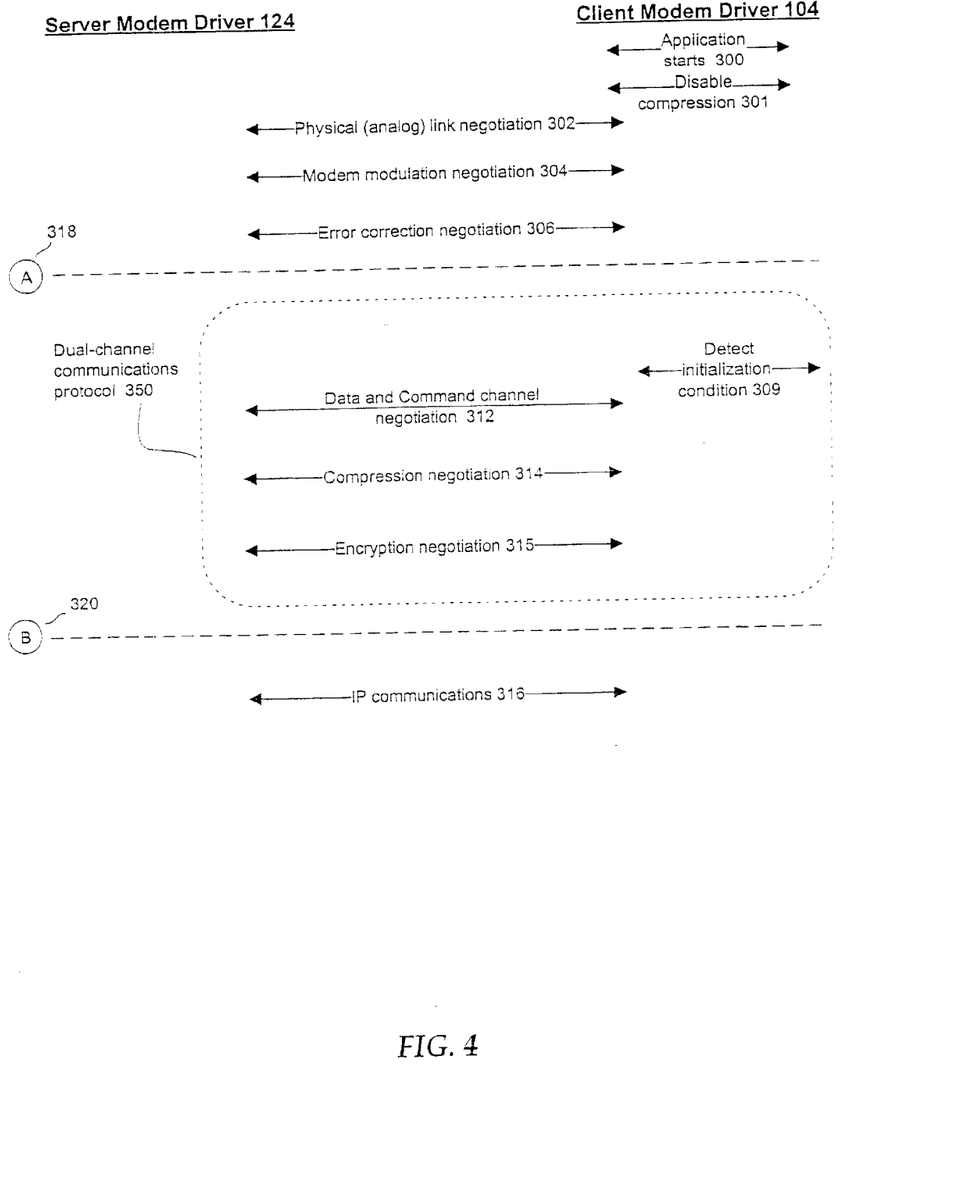
FIG. 4 is a schematic diagram showing the stages of negotiation used in the establishment of a dual-channel communication link as provided by an embodiment of the present invention.

FIG. 4 is a schematic diagram showing the stages of negotiation used in the establishment of a dual-channel communication link as provided by an embodiment of the present invention. An application starts 300 by invoking client modem driver 104 to initialize the client modem 102, a command is executed to disable compression 301. Data compression is disabled in order to prepare the link for dual-channel communications protocol 350 negotiation. Commands to disable compression can be issued using the AT Command set, the de facto standard language for controlling modems. The AT command set was developed by Hayes and is recognized by virtually all personal computer modems. An example AT Command for disabling data compression is "%C0, an example command to enable data compression is "%C1". The client modem driver 104 of the present invention implements protocols to negotiate and execute a dual-channel communications link with various compression techniques to reduce data transmission costs. These negotiations are carried out between client modem driver 104 and server modem driver 124. Physical (analog) link negotiation 302 provides an analog connection that modem modulation negotiation 304 uses to create a digital connection between two modems. Error correction negotiation 306 adds a high degree of reliability to the digital connection through the use of various error detection and error correction mechanisms. Checkpoint A 318 in FIG. 4 represents the point in the protocol negotiations at which a reliable digital connection has been established and IP encapsulated transmission could take place. The present invention inserts an additional protocol, the dual-channel communications protocol 330, into existing negotiations to establish a more robust and efficient communications link.

Figure 6:
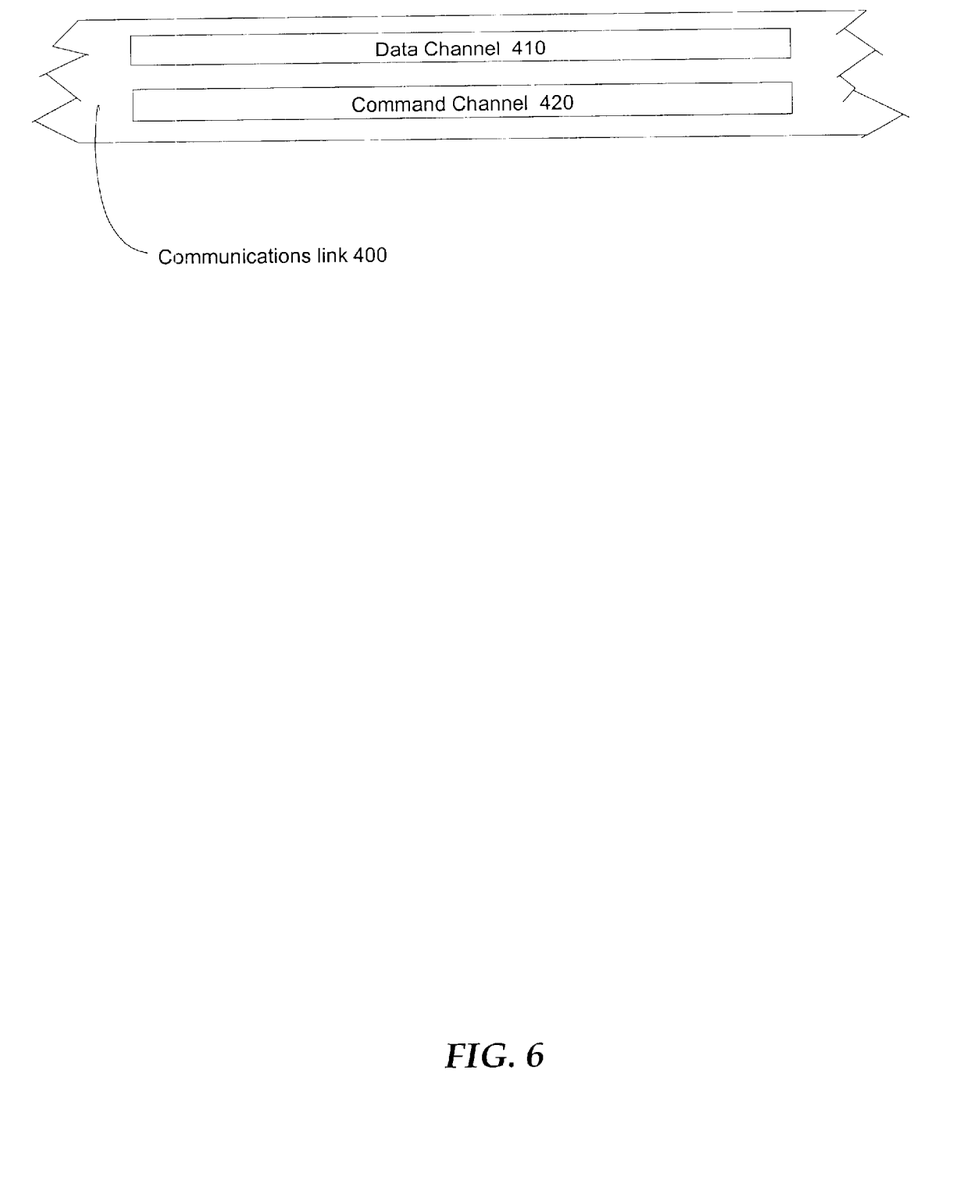
FIG. 6 is an illustration a communication link configured according to an embodiment of the present invention.

Once a reliable digital connection has been established the dual-channel communications protocol 350 creates a data channel and command channel using Data and Command channel negotiation 312. The dual-channel communications protocol 350 will detect initialization condition 309 when the connection established has an error correction protocol enabled and data compression disabled. This initialization condition will trigger the data and command channel negotiation 312 to create data channel 410 (FIG. 6) and command channel 420 (FIG. 6). These negotiations can be performed within the bailout limit of two seconds provided for IP encapsulation transmissions (e.g., PPP or SLIP). A successful dual-channel communications protocol 350 negotiation can be completed in less than 500 milliseconds.

Creating the data channel 410 and command channel 420 is accomplished by allocating a certain ratio of the bit stream transmitted over communications link 400 (FIG. 6) to data channel 410 and allocating the remainder to command channel 420. Once a ratio (bandwidth) has been established, allocation of the command channel bits can be interspersed with data channel bits. For example, one bit out of every one hundred bits transmitted can constitute the command channel 420, leaving the remaining 99 bits for data channel 410. An alternate approach to creating data channel 410 and command channel 420 is to provide for transmission of a finite group of bits together (the command channel 420), after a predetermined number of bits have been transmitted (the data channel 410). For example, after every 2048 bits transmitted, the next eight bits would data recognized as command channel 420 data.

When the data channel 410 has been established compression negotiation 314 is invoked to establish an optimal compression algorithm for data transmitted over data channel 410. Compression negotiation 314 uses the command channel 420 to establish that both ends of the communications link 400 (i.e., client modem driver 104 and server modem driver 124) have a common compression algorithm available. Compression negotiation 314 then uses information from the command channel 410 to determine the optimal compression to use based upon the type of data likely to be transferred on the data channel 410. The table below illustrates approximate compression for some known compression algorithms over common data types.

| Name | Random | Text | Graphics | Executables | Mixed(3) |
|---|---|---|---|---|---|
| V.42bis | 1:1 | 4:1 | 10:1 | 2.5:1 | 5:1 |
| MNP5 | <1:1 | 1.5:1 | 2:1 | 1:1 | 1:1 |

In the event that not enough information has been gathered from the command channel 420 to identify an optimal algorithm, one of the algorithms which has been designated as the default compression algorithm will be chosen. In the event that no negotiation succeeds, the driver will default to use no compression after a suitable timeout has occurred. The default compression algorithm will be one that is known to perform well over a large number of data types.

Typical computer modems support a variety of compression algorithms, including MNP5 and V.42bis. MNP5 uses a modified Huffman coding technique to provide data compression by reducing the amount of redundant data transmitted. MNP5 can reduce the amount of data transferred by a ratio of approximately 2:1. A known problem with MNP5 compression is that data that is already compressed (e.g., .ZIP, .JPG and .MPG files) will contain less redundancy than in its uncompressed state, and may require more time to compress and transmit than if it was transmitted without applying MNP5 compression. V.42bis is implemented using a string encoding (dictionary based) algorithm known as British Telecom Lempel Ziv ("BTLZ"). BTLZ is an on-the-fly algorithm that can turn itself off when it detects situations when compression will not enhance throughput. V.42bis can reduce the amount of data transferred by a ratio of approximately 4:1. The dual-channel communications protocol 350 provides a framework for selecting among existing compression algorithms as well as negotiating alternate compression schemes. When both client and server computers implement the same alternate compression algorithm, compression negotiation 314 can establish compression on the data channel 410 using that algorithm. An example alternate compression algorithm is the Lempel-Ziv-Heath ("LZH") algorithm disclosed by Jeff Heath of Hughes Network Systems, San Diego, Calif. at the Telecommunications Industry Association ("TIA") meeting in San Jose, Calif. on Apr. 14, 1999. The LZH algorithm is a Committee Contribution to the TIA Technical Committee TR-30, document number TR-30.1/99-02-004R1, the contents of which are incorporated herein by reference. This paper was submitted to the committee with the intent that the committee consider creating an additional International Telecommunications Union ("ITU") Recommendation, based upon the LZH algorithm, for data compression procedures for use with the Error Correction Procedures defined in Recommendation V.42. LZH provides significantly better compression ratios than V.42bis-a 10% to 35% improvement is typical. Some benefits of using alternate compression algorithms are: 1) improved performance because they are typically implemented in software and run on the fast CPUs of host computers (i.e., not on the slow CPUs of modems); 2) increased throughput because the compression scheme can be tailored to the task at hand; and 3) improved upgradeability because newer versions can be loaded on client and servers computers and the compression negotiation 314 process will use them.

Using techniques similar to compression negotiation 314, encryption negotiation 315 provides a framework to select among various encryption algorithms for establishing encryption of the data transmitted over data channel 410. Establishing encryption on the data channel is an option in the preferred embodiment. Commercially available encryption algorithms can be selected, such as the Rivest-Shamir-Adleman ("RSA") patented public key encryption algorithm, introduced by Ronald Rivest, Adi Shamir, and Leonard Adleman in 1978, on which the Pretty Good Privacy ("PGP") encryption program is based, as well as proprietary encryption algorithms.

IP communications 316 takes place over the reliable, digital, compression enabled data channel 410 once compression negotiation 314 completes. Checkpoint B 320 in FIG. 4 represents the point in the protocol negotiations at which a reliable, digital, compression enabled connection has been established and IP encapsulated transmission can take place.

Figure 5:
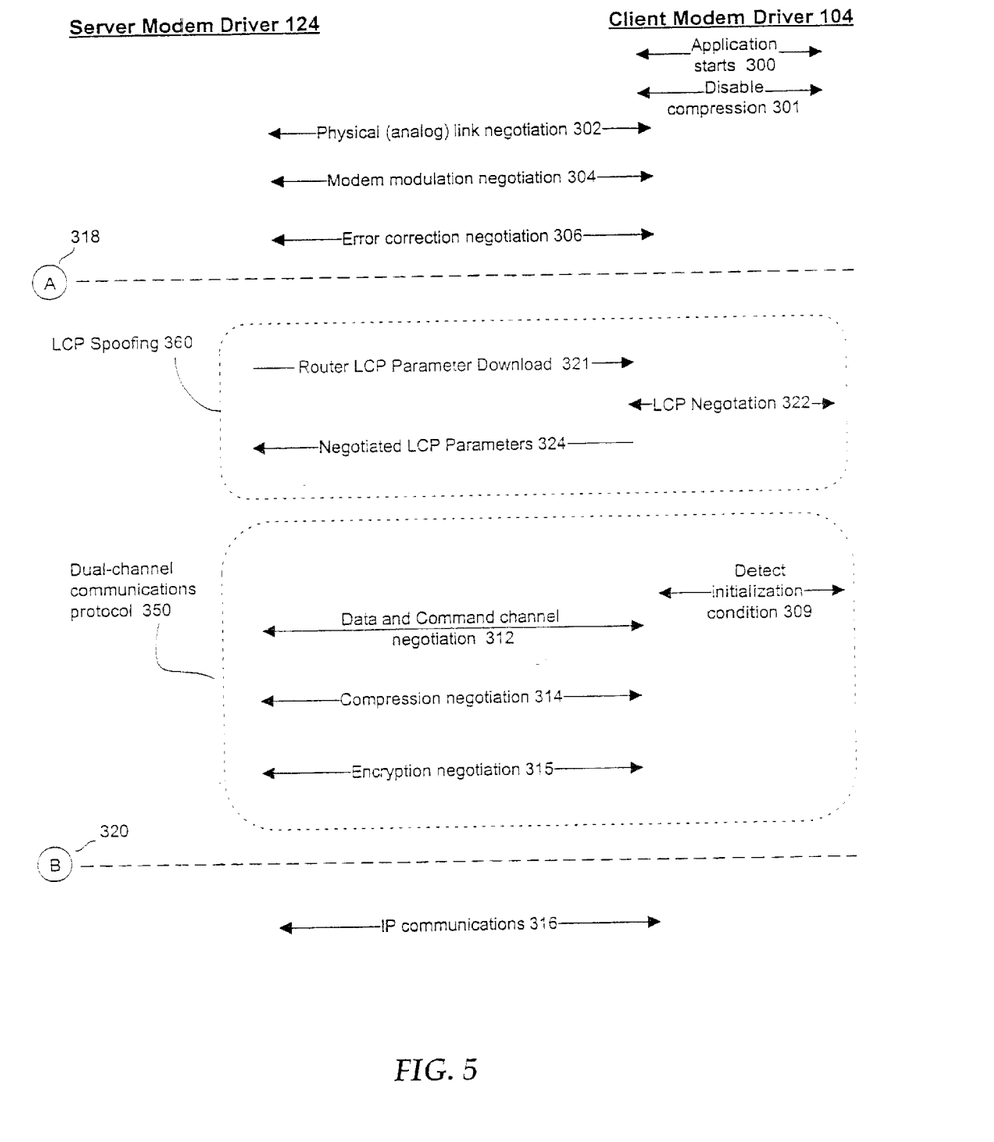
FIG. 5 is a schematic diagram showing the stages of negotiation used in the establishment of a dual-channel communication link including LCP spoofing as provided by an embodiment of the present invention.

FIG. 5 is a schematic diagram showing the stages of negotiation used in the establishment of a dual-channel communication link including LCP spoofing as provided by an embodiment of the present invention. LCP negotiation occurs between a router and a modem application attempting to establish a PPP link. PPP link establishment involves three stages: 1) LCP negotation, 2) authentication, and network control protocol negotiation. LCP negotiation takes a great deal of time (often seconds), this can amount to a significant amount of time used in establishing a PPP link. Reducing the amount of time needed to establish a PPP link provides a better overall experience for a data communication user. Spoofing is the practice of making a transmission appear to come from one source, when in fact it is coming from another. Specifically, LCP spoofing is the process of supplying a router's LCP parameters to a client application without the client actually having to communicate with the router. This is accomplished by downloading the LCP parameters to a software agent running locally on a client computer, the agent can act for the router in the negotiation process and short-cut many communications between the router and application. There are approximately twenty LCP parameters that are negotiable, six to twelve of these are commonly negotiated. An optimization of the LCP spoofing process could concentrate only on the most commonly negotiated LCP parameters. LCP spoofing 360 is accomplished by preforming a router LCP parameter download 321 such that the router's LCP parameters are available on the client during LCP negotiation 322. The negotiated LCP parameters 324 are then returned to the router for configuration. The largest benefit occurs when all of the LCP parameters can be negotiated locally. In the event that some communications with the router must occur the present invention can reduce the amount of that communication having the client supply a packet of information back to the router for use in its negotiation.

Compression negotiation 314 and encryption negotiation 315 can occur serially or simultaneously. Additionally, other enhanced capabilities, such as LCP negotiation may occur serially or simultaneously as the application determines what order is most effective. No restrictions are imposed on the order in which enhanced capabilities are invoked and any combination of serial and simultaneous operation is possible.

FIG. 6 is an illustration a communication link 400 configured according to an embodiment of the present invention. Data channel 410 and command channel 420 are created by data and command channel negotiation 312. The data channel 410 is created for the transmission of data packets, which can be compressed according to compression negotiation 314 and encrypted according to encryption negotiation 315. The command channel 420 is created to send and receive command and status information related to the operation of the data channel 410. In one embodiment the command channel operates at approximately 300–600 bits-per-second out of an approximately 30 kilobits-per-second connection (about 1% to 2% of total capacity). The bandwidth of the command channel and data channel can be adjusted on-the-fly to suit various data communications needs.

While this invention has been particularly shown and described with references to preferred embodiments thereof, it will be understood by those skilled in the art that various changes in form and details may be made therein without departing from the spirit and scope of the invention as defined by the appended claims.

What is claimed:

1. A system providing a framework for the negotiation of a dual-channel communication protocol between modems connected by a communications link comprising:

an initializer for disabling an existing communications protocol;

a detector for determining conditions allowing for the negotiation of the dual-channel communication protocol;

a channel builder for establishing the dual-channel communications protocol comprising:

a data channel of the dual-channel communications protocol enabled for sending and receiving data; and a command channel of the dual-channel communications protocol enabled for channel command and status information; and a negotiator for selecting a supplemental algorithm for running on the data channel from a plurality of algorithms;

wherein the initializer, the detector, the channel builder and the negotiator, in total, complete their respective execution in a configureable and finite amount of time and wherein the conditions include error correction being enabled and data compression being disabled between the modems.

2. The system of claim 1 wherein the supplemental algorithm comprises at least one of:

a compression algorithm and an encryption algorithm.

3. The system of claim 2 wherein the compression algorithm is the Lempel-Ziv-Health compression algorithm.

4. A system providing a framework for the negotiation of a dual-channel communication protocol between modems connected by a communications link comprising:

an initializer for disabling an existing communications protocol;

a detector for determining conditions allowing for the negotiation of the dual-channel communication protocol;

a channel builder for establishing the dual-channel communications protocol comprising:

a data channel of the dual-channel communications protocol enabled for sending and receiving data; and a command channel of the dual-channel communications protocol enabled for channel command and status information; and a negotiator for selecting a supplemental algorithm for running on the data channel from a plurality of algorithms;

wherein the initializer, the detector, the channel builder and the negotiator, in total, complete their respective execution in a configureable and finite amount of time; wherein LCP parameter information is transmitted as part of establishing the data channel; and the supplemental algorithm performs spoofing of the LCP negotiation process.

5. A system providing a framework for the negotiation of a dual-channel communication protocol between modems connected by a communications link comprising:

an initializer for disabling an existing communications protocol;

a detector for determining conditions allowing for the negotiation of the dual-channel communication protocol;

a channel builder for establishing the dual-channel communications protocol comprising:

a data channel of the dual-channel communications protocol enabled for sending and receiving data; and a command channel of the dual-channel communications protocol enabled for channel command and status information; and a negotiator for selecting a supplemental algorithm for running on the data channel from a plurality of algorithms;

wherein the initializer, the detector, the channel builder and the negotiator, in total, complete their respective execution in a configureable and finite amount of time; wherein the status information includes information on the communications link error rate and the communications link throughput level.

6. A method of providing a framework for the negotiation of a dual-channel communication protocol between modems connected by a communications link comprising the steps of:
 (a) disabling an existing communications protocol;
 (b) determining conditions allowing for the negotiation of the dual-channel communication protocol;
 (c) establishing the dual-channel communications protocol comprising:
  a data channel of the dual-channel communications protocol enabled for sending and receiving data; and
  a command channel of the dual-channel communications protocol enabled for channel command and status information; and
 (d) selecting a supplemental algorithm for running on the data channel from a plurality of algorithms;
 wherein the disabling step, the determining step, the establishing step and the selecting step, in total, complete their respective execution in a configureable and finite amount of time and wherein the conditions include error correction being enabled and data compression being disabled between the modems.

7. The method of claim 6 wherein the supplemental algorithm comprises at least one of:
 a compression algorithm and an encryption algorithm.

8. The method of claim 7 wherein the compression algorithm is the Lempel-Ziv-Health compression algorithm.

9. A method of providing a framework for the negotiation of a dual-channel communication protocol between modems connected by a communications link comprising the steps of:
 (a) disabling an existing communications protocol;
 (b) determining conditions allowing for the negotiation of the dual-channel communication protocol;
 (c) establishing the dual-channel communications protocol comprising:
  a data channel of the dual-channel communications protocol enabled for sending and receiving data; and
  a command channel of the dual-channel communications protocol enabled for channel command and status information; and
 (d) selecting a supplemental algorithm for running on the data channel from a plurality of algorithms;
 wherein the disabling step, the determining step, the establishing step and the selecting step, in total, complete their respective execution in a configureable and finite amount of time; wherein LCP parameter information is transmitted as part of establishing the data channel; and
 the supplemental algorithm performs spoofing of the LCP negotiation process.

10. A method of providing a framework for the negotiation of a dual-channel communication protocol between modems connected by a communications link comprising the steps of:
 (a) disabling an existing communications protocol;
 (b) determining conditions allowing for the negotiation of the dual-channel communication protocol;
 (c) establishing the dual-channel communications protocol comprising:
  a data channel of the dual-channel communications protocol enabled for sending and receiving data; and
  a command channel of the dual-channel communications protocol enabled for channel command and status information; and
 (d) selecting a supplemental algorithm for running on the data channel from a plurality of algorithms;
 wherein the disabling step, the determining step, the establishing step and the selecting step, in total, complete their respective execution in a configureable and finite amount of time; wherein the status information includes information on the communications link error rate and the communications link throughput level.

11. A computer program product comprising:
 a computer usable medium for providing a framework for the negotiation of a dual-channel communication protocol between modems connected by a communications link;
 a set of computer program instructions embodied on the computer usable medium, including instructions to:
  disable an existing communications protocol;
  determine conditions allowing for the negotiation of the dual-channel communication protocol;
  establish the dual-channel communications protocol comprising:
   a data channel of the dual-channel communications protocol enabled for sending and receiving data; and
   a command channel of the dual-channel communications protocol enabled for channel command and status information; and
  select a supplemental algorithm for running on the data channel from a plurality of algorithms;
  wherein the instructions to disable, determine, establish and select, in total,
  complete their respective execution in a configureable and finite amount of time and wherein the conditions include error correction being enabled and data compression being disabled between the modems.

12. The computer program product of claim 11 wherein the supplemental algorithm comprises at least one of:
 a compression algorithm and an encryption algorithm.

13. The system of claim 12 wherein the compression algorithm is the Lempel-Ziv-Health compression algorithm.

14. A computer program product comprising:
 a computer usable medium for providing a framework for the negotiation of a dual-channel communication protocol between modems connected by a communications link;
 a set of computer program instructions embodied on the computer usable medium, including instructions to:
  disable an existing communications protocol;
  determine conditions allowing for the negotiation of the dual-channel communication protocol;
  establish the dual-channel communications protocol comprising:
   a data channel of the dual-channel communications protocol enabled for sending and receiving data; and
   a command channel of the dual-channel communications protocol enabled for channel command and status information; and
  select a supplemental algorithm for running on the data channel from a plurality of algorithms;
  wherein the instructions to disable, determine, establish and select, in total, complete their respective execution in a configureable and finite amount of time;

wherein LCP parameter information is transmitted as part of establishing the data channel; and the supplemental algorithm performs spoofing of the LCP negotiation process.

15. A computer program product comprising:

a computer usable medium for providing a framework for the negotiation of a dual-channel communication protocol between modems connected by a communications link;

a set of computer program instructions embodied on the computer usable medium, including instructions to:

disable an existing communications protocol;

determine conditions allowing for the negotiation of the dual-channel communication protocol;

establish the dual-channel communications protocol comprising:

a data channel of the dual-channel communications protocol enabled for sending and receiving data; and a command channel of the dual-channel communications protocol enabled for channel command and status information; and select a supplemental algorithm for running on the data channel from a plurality of algorithms;

wherein the instructions to disable, determine, establish and select, in total, complete their respective execution in a configureable and finite amount of time;

wherein the status information includes information on the communications link error rate and the communications link throughput level.

* * * * *

UNITED STATES PATENT AND TRADEMARK OFFICE
CERTIFICATE OF CORRECTION

PATENT NO. : 6,768,749 B1
DATED : July 27, 2004
INVENTOR(S) : Bruce P. Olser and Kevin Riley It is certified that error appears in the above-identified patent and that said Letters Patent is hereby corrected as shown below:

Column 8,
Line 23, delete "Health" and insert -- Heath --

Column 9,
Line 33, delete "Health" and insert -- Heath --

Column 10,
Line 45, "Health" and insert -- Heath --

Signed and Sealed this

Fifth Day of October, 2004

JON W. DUDAS
*Director of the United States Patent and Trademark Office*